United States Patent [19]
Cole et al.

[11] Patent Number: 5,838,724
[45] Date of Patent: Nov. 17, 1998

[54] SPECTRAL AND POWER SHAPING MAPPER FOR HIGH DATA RATE SIGNALLING

[75] Inventors: Paul Dana Cole, Fairfield; Yuri Goldstein, Southbury; William Hanna, Wolcott, all of Conn.

[73] Assignee: General DataComm, Inc., Middlebury, Conn.

[21] Appl. No.: 872,630

[22] Filed: Jun. 10, 1997

Related U.S. Application Data

[63] Continuation-in-part of Ser. No. 807,955, Mar. 4, 1997, Ser. No. 801,066, Feb. 14, 1997, Ser. No. 838,367, Apr. 8, 1997, and Ser. No. 851,597, May 5, 1997.

[51] Int. Cl.$^6$ .................................................. H04B 1/38
[52] U.S. Cl. ........................................ 375/222; 375/295
[58] Field of Search .................................. 375/222, 295, 375/268, 300; 370/207; 332/115; 455/108

[56] References Cited

U.S. PATENT DOCUMENTS

| | | | |
|---|---|---|---|
| 5,394,437 | 2/1995 | Ayanoglu et al. | 375/222 |
| 5,406,583 | 4/1995 | Dagdeviren | 375/216 |
| 5,436,930 | 7/1995 | Bremer et al. | 375/295 |
| 5,528,625 | 6/1996 | Ayanoglu et al. | 375/222 |
| 5,696,794 | 12/1997 | O'Dea | 375/296 |

FOREIGN PATENT DOCUMENTS

PCT/US95/
15924  12/1995  WIPO .

OTHER PUBLICATIONS

ITU–T Recommendation V.34, Sep. 1994, "Data Communication Over the Telephone Network".

"The Capacity of PCM Voiceband Channels", Kalet, et al., IEEE Intern'l Conference on Communications'93, pp. 507–511.

"A Mathematical Theory of Communication". Bell Systems Technical Journal, 27:379–423, 623–656.

*Primary Examiner*—Temesghen Ghebretinsae
*Attorney, Agent, or Firm*—David P. Gordon; David S. Jacobson; Thomas A. Gallagher

[57] ABSTRACT

A spectral and power shaping mapper for high data rate signaling modem functions in a first mode having spectral and power shaping and using convolutional encoding, a second mode having power shaping, a third mode having power shaping using convolutional encoding, and a fourth mode having straight-forward mapping. Based on data rates and other criteria, incoming bits are grouped together, with a first subgroup of bits used in the first mode to generate two sign vectors (and in the other modes a single vector), a second subgroup of bits used in conjunction with an appended bit in the first, second and third modes to generate at least two magnitude manipulation vectors, and a third subgroup of bits used in a modulus converter to generate a plurality of quotients. The quotients and magnitude manipulation vector(s) are used to select one, two or four sequences of constellation points from a multidimensional constellation depending on mode. The sequences of selected points are combined with the sign vector(s) to generate, one, two or four sequences of octets for a shaping selector. In the first and third modes, the shaping selector employs a convolutional encoder state machine which uses criteria such as lowest cost paths and/or lowest average power in order to select which sequence of octets to output. In the second mode, selection is based on power only. In the fourth mode, the generated octets are output as there is no choice of octets.

19 Claims, 2 Drawing Sheets

SPECTRAL AND POWER SHAPING MAPPER FOR HIGH DATA RATE SIGNALLING

This is a continuation-in-part of U.S. Ser. Nos. 08/807,955 filed Mar. 4, 1997, 08/801,066 filed Feb. 14, 1997, 08/838,367 filed Apr. 8, 1997, and 08/851,597 filed May 5, 1997 entitled "Spectral and Power Shaping Mapper for High Data Rate Signalling" (Docket #GDC-112) all of which are hereby incorporated herein by reference in their entireties.

BACKGROUND OF THE INVENTION

1. Field of the Invention

The present invention relates to data communications equipment. More particularly, the present invention relates to mapping systems and methods having advantageous applications in high speed modems which are coupled to an analog local loop.

2. State of the Art

With the ever-increasing importance of telecommunications for the transfer of data as well as voice, there has been a strong effort to increase data transfer rates over the telephone wires. Recently, the ITU-T adopted the V.34 Recommendation (International Telecommunication Union, Telecommunication Standardization Sector Recommendation V.34, Geneva, Switzerland 1994) which is hereby incorporated by reference herein in its entirety. The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, recently, there has been a thrust to provide additional standards recommendations which will increase data transfer rates even further (note the TIA TR-30.1 PAM Modem ad hoc group and the ITU-T Study Group 16).

Recognizing that further increases in data rates is theoretically limited where the telecommunication network is an analog system (see C. E. Shannon, "A Mathematical Theory of Communication," *Bell System Technical Journal,* 27:379–423, 623–656 (1948)), there have been various proposals to take advantage of the fact that much of the telecommunication network is now digital. For example, U.S. Pat. Nos. 5,394,437 to Ayanoglu et al., 5,406,583 to Dagdeviren, and 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications* '93, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics which are ostensibly based on Townshend envision the use of the V.34 Recommendation technology for upstream communications.

As will be appreciated by those skilled in the art, the technologies underlying the V.34 Recommendation, and the proposed 56 kbps modem are complex and typically require the use of high-end digital signal processors (DSPs). One of the complex tasks of the modem is the mapping of digital data into a sequence of digital signals chosen from a constellation which are converted into an analog signal by a D/A converter. Mapping typically includes utilizing a constellation. In the V.34 Recommendation, the preferred constellation is a four-dimensional constellation, whereas in the envisioned 56 kbps modems, the constellation is envisioned as a one dimensional PAM constellation which complies with $\mu$-law (A-law in Europe) requirements. According to $\mu$-law requirements which are set forth in ITU-T Recommendation G.711 which is hereby incorporated by reference herein in its entirety, the total constellation consists of 255 signal levels; 127 positive, 127 negative, and zero. Both the positive portion of the constellation and the negative portion of the constellation include eight sectors with sixteen points each (the constellation being shown in Appendix 1 hereto), with zero being a common point for both portions. As is well known in the art, the minimum distance between points in sector 1 of the constellation is a distance "2". In sector 2, the minimum distance is "4", while in sector 3, the minimum distance is "8". In the eighth sector, the minimum distance is "256".

Using the full PAM $\mu$-law constellation, theoretically, a bit rate of almost 64 kbps can be transmitted over the analog local loop to the digital network. However, the average power of such a constellation would be about −4 dBm, and the minimum distance between points would be a distance of "2". Such a large average power is undesirable when compared to the present restrictions of an average power of −12 dBm on the network; and such a minimum distance is also undesirable, with minimum distances of at least "4", and preferably "8" being considerably more desirable in reducing errors due to noise.

In light of the power restrictions, and minimum distance considerations, the prior art primarily discusses sending data at 56 kbps (i.e., seven bits per symbol at an 8 kHz rate). However, even rates of 56 kbps are rarely obtained in practice due to several factors. One of the factors relates to the fact that the hybrid transformer of a modem in the central office line-card introduces non-linear distortion which occurs primarily in the low frequency bands of the flat spectrum, especially in the range of DC (0 Hz) to 100 Hz. Therefore, it is desirable to suppress the low frequency components in the $\mu$-law output signal; i.e., to shape the spectrum.

SUMMARY OF THE INVENTION

It is therefore an object of the invention to provide a mapper for a high data rate signalling device which has spectral shaping capabilities.

It is another object of the invention to provide a PAM mapper for a high data rate modem which utilizes multidimensional constellations and which includes means for manipulating the magnitude (average power) of a signal generated.

It is an additional object of the invention to provide a PAM mapper which is simple to implement and which does not require large computing and memory resources.

It is a further object of the invention to provide a PAM mapper which has means for spectral shaping and average power manipulation, and which provides signals which are easily decoded.

Another object of the invention is to provide a PAM mapper which can map in a plurality of modes and be sufficiently flexible to enable spectral and/or power shaping if desired.

In accord with the objects of the invention, a mapper for a PAM encoder is provided which is arranged to function in several modes, including: a first mode such as set forth in parent application Ser. No. 08/851,597 (Docket GDC-112) having spectral shaping and power shaping and using convolutional encoding, a second mode having power shaping, a third mode having power shaping using convolutional encoding, and a fourth mode having straight-forward mapping (without power or spectral shaping and without convolutional encoding). The mapper, in order to be implement all four modes is substantially as set forth in parent application Ser. No. 08/851,597 (Docket GDC-112) and therefore preferably includes logic means for grouping incoming bits into three subgroups of bits, a constellation matrix memory which stores indications of at least one and preferably a plurality of different multidimensional constellations, calculation means which utilizes a first subgroup of the bits for generating a series of quotients ($r_k$), a differential encoder for encoding a second subgroup of the bits, a sign bit function block coupled to the differential encoder, a magnitude bit function block which receives a third subgroup of the bits and at least one additional bit, a constellation point selection means (coupled to at least the calculation means, to the magnitude bit function block, and to the constellation matrix memory) for selecting indications of a plurality of series of constellation points from at least one of the multidimensional constellations, and shaping selector means coupled to the constellation point selection means and to the sign bit function block for selecting outputs based on predetermined criteria. Preferably, the shaping selector is capable of storing information regarding a plurality of series of constellation point indications generated for a plurality (d) of bit groups and incorporates a convolutional encoder state machine which has $2^d$ paths emanating from each state of the state machine.

According to the invention, mode control means is provided, and the sign bit function block, the magnitude bit function block, the grouping logic means, the calculation means, the constellation point selection means, and the shaping selector are all responsive to mode control signals which enable any of the four modes of operation. With respect to the sign bit function block, in three of the modes (straight-forward mapping, power shaping, and power shaping with convolutional encoding), spectral shaping is effectively disabled, and the sign function block (which is used in the spectral and power shaping with convolutional encoding mode) is arranged to simply pass the sign bits s(t) without processing. With respect to the magnitude bit function block, in two of the four modes (power shaping, and spectral and power shaping with convolutional encoding), the magnitude bit function block functions as set forth in parent application Ser. No. 08/851,597 (Docket #GDC-112); i.e., it receives a subgroup of bits, appends another bit to the subgroup, uses the resulting assemblage of bits as a first magnitude vector, and generates a second magnitude vector by XORing the assemblage with another predetermined vector. In a third of the four modes (power shaping using convolutional encoding), the magnitude function block is used to generate four magnitude vectors instead of two, and the constellation point selector (under mode control) is used to generate four sets of point indications utilizing the four magnitude vectors. In a fourth of the four modes (straight-forward mapping), the magnitude function block does not append a bit to the received bits (i.e., under mode control, a different number of bits are grouped together by the grouping logic means), and the received bits are simply passed to the constellation point selector without processing for selection of a single set of point indications.

As suggested above, under mode control, the constellation point selector generates different numbers of sets of points depending upon the mode which is enabled. Thus, in the straight-forward mapping mode, a single set of points is generated. In the power shaping using convolutional encoding mode, four sets of points are generated by the constellation point selector. In the other two modes, two sets of points are generated. Similarly, under mode control, the shaping selector undertakes different tasks. In two of the modes (straight-forward mapping, and power shaping), the shaping selector does not undertake convolutional encoding. In fact, in the straight-forward mapping mode, the shaping selector does not shape at all, but preferably finds the $\mu$-law value associated with the points provided by the constellation point selector (in conjunction with the sign bits); while in the power shaping mode where two sets of points are generated, the shaping selector selects the points with the lowest power. In the other two modes (power shaping using convolutional encoding, and spectral and power shaping using convolutional encoding), while convolutional encoding is utilized, the criteria for selection of points is different. In the power shaping using convolutional encoding mode, point selection is based on path power; while in the spectral and power shaping using convolutional encoding mode, as discussed in the parent application Ser. No. 08/851,597 (Docket #GDC-112), the criteria for selection deal with cumulative sums of the $\mu$-law code levels indicated in the paths, with the series of constellation points from a lowest cost path being selected for a given group of bits. In lieu of the low frequency filtering provided by cumulative sums, other forms of discrete time filtering can be beneficially utilized.

According to a preferred aspect of the invention, and as discussed in the parent applications hereto, the number of bits initially grouped together is based on the data rate, with many different data rates being enabled through the use of several N-dimensional constellations (N being an integer $\geq 1$). With the use of multi-dimensional constellations, the symbols generated are placed in a frame of f symbols. In the preferred embodiment of the invention, the frame is six symbols long (f=6) in order to enable mapping techniques in the presence of robbed bit signaling. Regardless, from the grouped bits, the subgroup of sign bits is drawn, with one sign bit for each symbol. Thus, for a frame of six symbols, the sign bit subgroup would include six bits. The sign bits are provided to the differential encoder which provides encoded bits to the sign bit function block.

In accord with yet another preferred aspect of the invention, the constellation point selection means utilizes the outputs of the magnitude bit function block and the quotients in selecting a plurality of series of constellation points from at least one constellation in the constellation matrix memory. The magnitude bits are preferably used to generate values for a function $h_k$, where k is a slot index taking a value from 1 to f. A function of $h_k$ and the quotients $r_k$ are used as a selection index $p_k$ according to $p_k = N_k(h_k) + r_k + 1$, where $N_k$ are integers chosen based on data rates and constellation sizes. Indications (typically in the form of seven bit words) of one or more series of selected points (depending upon the mode) are then preferably provided in a "combinatorial" fashion with the output(s) of the sign bit function block (depending upon the mode) to generate one or more series (depending uon the mode) of octets which are received at the shaping selector.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
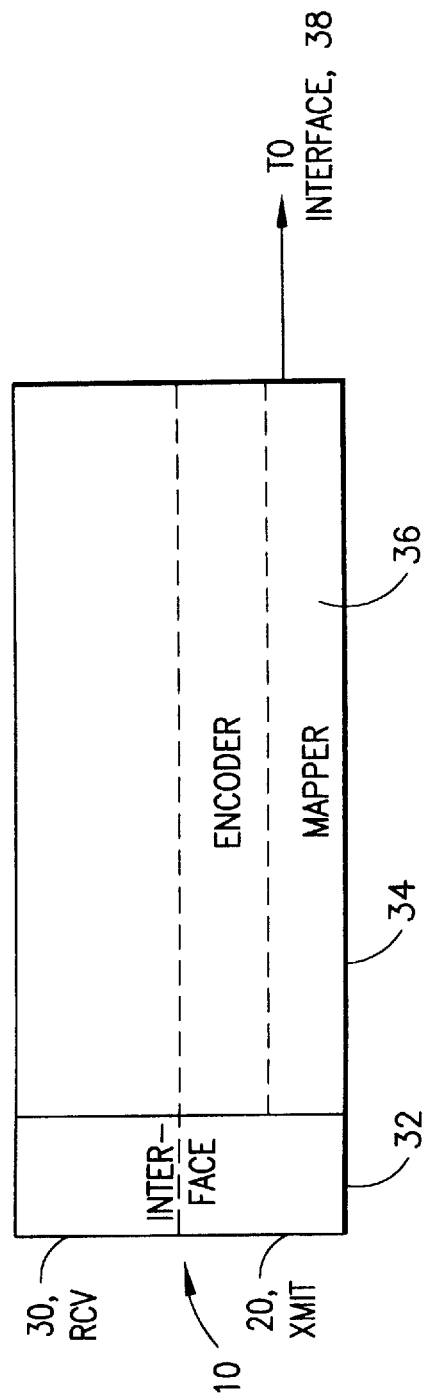
FIG. 1 is a high level block diagram of the PAM modem of the invention.

Turning to FIG. 1, a high level block diagram of a PAM modem 10 is seen. The modem 10 broadly includes a transmitter 20 and a receiver 30. The transmitter includes an interface 32 to a source of digital data (such as a computer), an encoder 34 which includes a mapper 36, and an interface 38. Details of the receiver side of the modem are well known and are not shown in FIG. 1.

Figure 2:
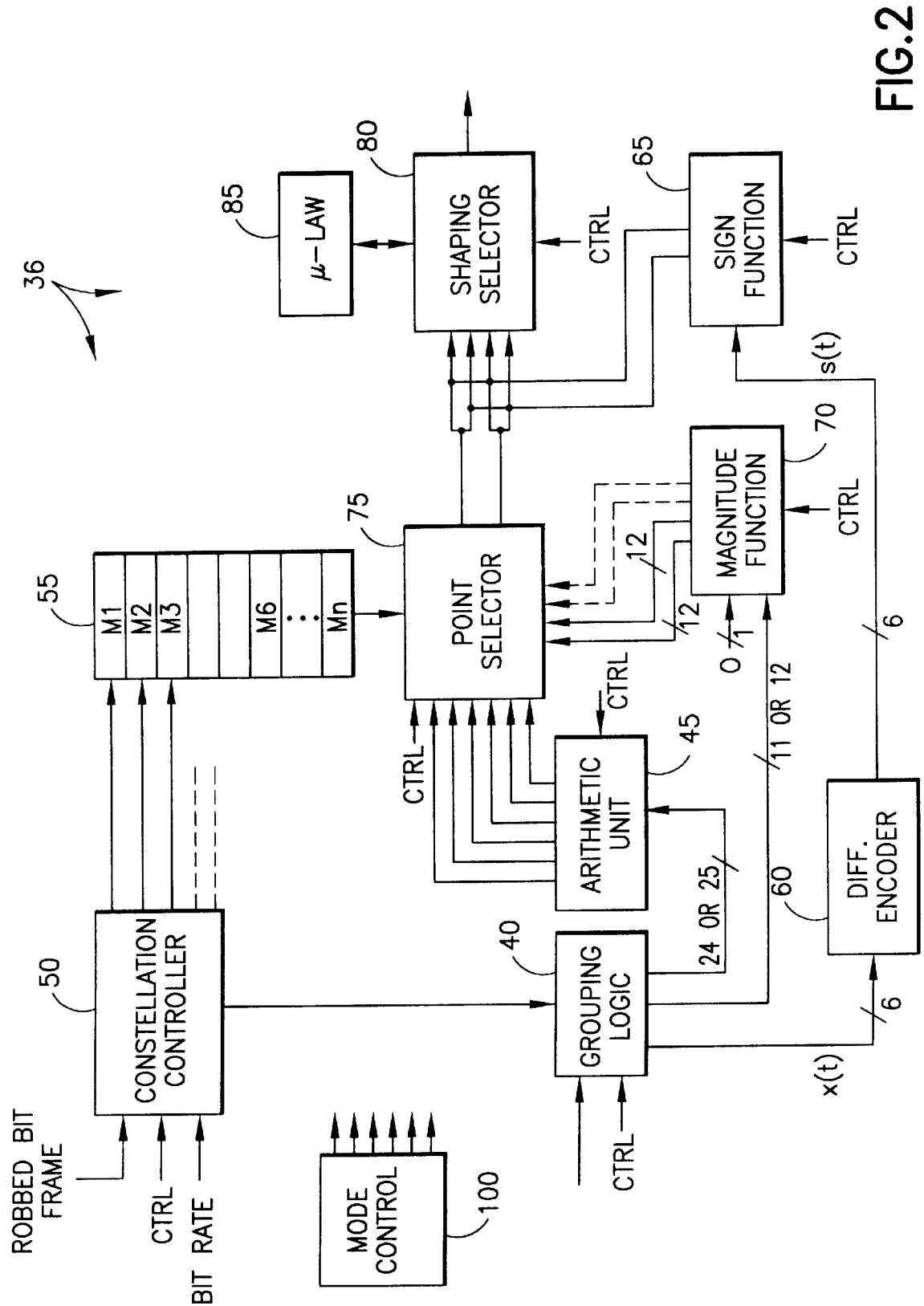
FIG. 2 is a block diagram of the mapper of FIG. 1 according to a first embodiment the invention.

According to the preferred embodiment of the invention, and as seen in FIG. 2, the mapper 36 for the PAM encoder 34 preferably includes logic means 40 for grouping incoming bits into subgroups of bits, calculation means (arithmetic unit) 45 for generating a series of quotients, a constellation controller 50, a constellation matrix memory 55 which stores indications of constellations, a differential encoder 60, a sign function block 65, a magnitude function block 70, a point selector 75, a shaping selector 80, and a $\mu$-law-value look-up table 85. Each of these elements may implemented in one or more hardware elements or in software. Typically, the memory elements including the constellation matrix memory 55, the $\mu$-law-value look-up table 85, and memory (discussed hereinafter) utilized by the shaping selector 80 would be implemented in a single memory element such as a RAM or ROM, while the arithmetic and logic elements, including the constellation controller 50, the grouping logic 40, the arithmetic unit 45, the differential encoder 60, the sign function block 65, the magnitude function block 70, the point selector 75, and the shaping selector 80 would be implemented in a single processor element such as a DSP or microprocessor. As seen in FIG. 2, a mode control block 100 is also provided. The mode control block 100 provides control signals which, depending upon the control signal, causes one or more of the grouping logic means 40, the arithmetic unit 45, the constellation controller 50, the sign function block 65, the magnitude function block 70, the point selector 75, and the shaping selector 80 to function differently. The mode control block 100 may be embodied as a separate logic means responsive to control by an external microprocessor (not shown), as part of a DSP which also includes the arithmetic and logic elements described above and responsive to the external microprocessor, or as part of a microprocessor which also includes the arithmetic and logic elements described above.

As discussed in the parent applications hereto, depending upon several factors, including the condition of the physical lines, pad attenuation, the presence of robbed bit signaling, etc., a bit rate at which the modem is to function is determined. This bit rate information is utilized by the constellation controller 50 in conjunction with a mode control signal from mode control block 100 to coordinate the grouping of bits by the grouping logic 40 with the choice of constellations from which indications of points are taken by the point selector 75 (as described in more detail below). Thus, by way of example (and not by way of limitation) and for purposes of explanation of FIG. 2, if an outgoing data rate of 56K is desired, according to the invention, seven data bits per symbol are to be transferred, and for a frame of six symbols, forty-two (6×7) bits are grouped together by the grouping logic 40. Of the forty-two bits, a first subgroup of six bits relating to sign information (one sign bit per symbol) is forwarded to the differential encoder 60 for processing as discussed below; a second subgroup of eleven or twelve bits (depending upon mode) is forwarded to the magnitude function block 70 for manipulation as discussed below; and a third subgroup of twenty-five or twenty-four bits (depending upon mode) is forwarded to the arithmetic unit 45 for processing as also discussed below.

Within the example of the 56K outgoing data rate, the invention will be described with reference to each of the four modes. The first mode, as set forth in parent application Ser. No. 08/851,597 (Docket GDC-112) is the mode which conducts spectral shaping and power shaping using convolutional encoding. In this mode (hereinafter referred to as the "first mode"), the first subgroup of six bits is provided to the differential encoder 60 for purposes of eliminating the effect of phase hits on the line (channel), and for expediting decoding. The differential encoding is conducted according to $s(t)=s(t-1)+x(t)$ as is well known in the art, where t is a time variable, x(t) represents the six bit subgroup, where s(t) is a sign vector output, and where the sign "+" indicates a binary sum (XOR). The six bit s(t) output is provided to the sign function block 65 which in turn, under mode control, generates two outputs: a first output s0__ which is equal to s(t), and a second output s1__ which is the complement (XOR) of s(t). These outputs are treated as two separate series of one bit outputs which are combined with outputs from the point selector 75 for input to the shaping selector 80.

In the first mode, under control of mode control 100, the grouping logic 40 groups a second subgroup of eleven bits and provides them to the magnitude function block 70. A "0" is also provided to the magnitude function block 70. Under mode control, in the first mode, the magnitude function block 70 appends the "0" to the eleven bit input, and generates two magnitude manipulation vector outputs from the resulting twelve bits: a first output e__0 which is the twelve bit assemblage, and a second output e__1 which is the XOR of the assemblage with a predetermined twelve bit value (binary vector) such as {010101010101}, although different magnitude shaping values could be utilized. As described in the parent application, for decoding purposes, the last bit of predetermined twelve bit value should be a "1", where the appended bit is a "0"; and vice versa. Both e__0 and e__1 are provided to the point selector 75 and used in a manner discussed below.

A third subgroup of twenty-five bits is provided to the arithmetic unit 45 which is used to generate a series of quotients ($r_k$) according to techniques discussed in at least one of the parent applications hereto (k being a slot index for the symbol in the frame). Thus, for example, where six indications of constellation points are to be chosen, the value represented by the twenty-five bits is divided under mode control by a sequence of divisors (e.g., $18^5$, $18^4$, $18^3$, $18^2$, 18, 1) to provide a series of six quotients (it being appreciated that $2^{25} \leq 18^6$). The six quotients $r_k$ of values between zero and seventeen are provided to the point selector 75 which is used to select constellation point indicators. It should be appreciated that the manner of choosing the divisors and determining the quotients is taught in more detail in the previously incorporated parent applications, and may depend upon the presence of robbed bit signaling, pad attenuation, different data rates, frame size, etc. It should also be appreciated that instead of using a modulus converter to generate values $r_k$, other techniques known in the art such as look-up tables, shell mapping, etc. could be utilized.

As previously mentioned, the point selector 75 receives inputs from the magnitude function block 70 and from the arithmetic unit 45. The point selector 75 preferably utilizes an equation which is a function of the inputs in order to select points from a constellation. For example, in the preferred embodiment of the invention a value for index p is calculated according to $p_k = N_k h_k r_k + 1$ where $N_k$ is an integer and where $h_k$ is a function of the bits received from the arithmetic unit 45 as discussed below. In one embodiment of the invention, each $N_k$ is chosen to be equal to the divisor base, and $h_k$ has a value of zero, one, two or three based on the bits received from the magnitude function block as discussed below. Thus, indices of value one through seventy-two are generated by the point selector 75 to access one of the seventy-two positive points of the 144 point 6D constellation stored in the matrix memory 55 (details of the 6D constellation are described in Appendix 3 of the parent application Ser. No. 08/807,955). For example, where $p_k = 37$, the thirty-seventh "1" value in the eight-by-sixteen matrix memory for that 6D constellation would be indicated, and the seven-bit location (1010001) corresponding to that indicated point (fifth row; first point) would be output. In this manner, under control of the mode control block 100, in the first mode, two series of f points each are chosen; one for each of the twelve bit outputs (e_0, and e_1) of the magnitude function block 70.

In the preferred embodiment of the invention, for a particular output of the magnitude function block 70, the twelve magnitude bits received by the point selector 75 are used to calculate values $h_k$ in the following manner. First, the twelve bits are grouped into f groups (i.e., six groups of two bits). The values $h_k$ are then taken as twice the value of the second bit of the group plus the value of the first bit of the group. Where the bits of a group are both ones, $h_k$ will equal three. Conversely, where the bits are both zeros, $h_k$ will equal zero. Where the first bit is a one and the second bit a zero, $h_k$ will equal one; and where the first bit is a zero and the second bit a one, $h_k$ will equal two. Since, in the first mode, the magnitude function block 70 generates two distinct outputs, it will be appreciated that $h_k$ for each output will be different. That is why, as discussed above, two separate series of k points are chosen by the point selector 75 in the first mode.

In the first mode, while two separate series of 7-bit values are generated by the point selector 75, the shaping selector means 80 receives four series of 8-bit values. The four series are generated by the combination of the two series of 7-bit outputs of the point selector 75 with the two series of one bit outputs of the sign function block 65. In other words, the 7-bit outputs generated using the magnitude function block outputs e_0 and e_1 are combined with the one bit outputs s0_ and s1_ generated by the sign function block to obtain four series of octets (denoted n00, n01, n10 and n11). These four series of octets are provided to the shaping selector means 80.

In the first mode, the shaping selector 80 stores the four series of octets for use in its convolutional encoder state machine. The amount of information which needs to be stored depends upon how far forward the encoder looks. In the presently preferred embodiment, the encoder looks forward two frames; i.e., three frames of four sets of six octets (where the frame size=six octets) are present in the shaping selector 80 at any point in time. However, it will be appreciated that fewer or more frames may be stored in the shaping selector for use by the convolutional encoder.

The convolutional encoder state machine makes a determination as to which of the plurality of series of octets to output based on certain predetermined criteria, and updates the state of the state machine accordingly. According to one embodiment of the invention, in the first mode, the criteria for selection deals with cumulative sum filtering of the $\mu$-law or A-law code levels indicated in the paths of the convolutional encoder, with the series of constellation points from a lowest cost path being selected for a given group of bits grouped by the logic means 40. In particular, at time t=1, a first set of four frames of octets n00(1), n01(1), n10(1) and n11(1) are generated as discussed above. At time t=2, a second set of four frames of octets n00(2), n01(2), n10(2), and n11(2) are generated. At time t=3, a third set of four frames of octets are generated and so forth. In the presently preferred embodiment of the invention, in the first mode, for each state of the two-state state machine, eight paths are generated as follows:

| if state = 0 | if state = 1 |
|---|---|
| path 10 n00(1), n00(2), n00(3) | path 11 n10(1), n10(2), n01(3) |
| path 20 n00(1), n11(2), n01(3) | path 21 n10(1), n01(2), n00(3) |
| path 30 n11(1), n01(2), n00(3) | path 31 n01(1), n11(2), n01(3) |
| path 40 n11(1), n10(2), n01(3) | path 41 n01(1), n00(2), n00(3) |
| path 50 n00(1), n00(2), n11(3) | path 51 n10(1), n10(2), n10(3) |
| path 60 n00(1), n11(2), n10(3) | path 61 n10(1), n01(2), n11(3) |
| path 70 n11(1), n01(2), n11(3) | path 71 n01(1), n11(2), n10(3) |
| path 80 n11(1), n10(2), n10(3) | path 81 n01(1), n00(2), n11(3) |

In the presently preferred embodiment of the invention, the eight paths for each state are chosen such that the second bit of the second group (2) is equal to the binary sum of the first bits of the first and second groups and so that the second bit of the third group (3) is equal to the binary sum of the first bits of the second and third groups.

As suggested above, in determining a six-byte output frame at time 1, the costs of the paths emanating from the current state of the convolutional encoder are analyzed. Thus, if the convolutional encoder is in state 0, paths 10–80 are analyzed for their respective costs. Similarly, if the convolutional encoder is in state 1, paths 11–81 are analyzed for their respective costs. The "cost" of a path is found preferably by finding the maximum absolute value of the cumulative sums of that path. With eighteen octets represented in a path, the eighteen cumulative sums for that path are calculated. The first cumulative sum for a path is equal to the previous sum $\Sigma$ (if any) present plus the $\mu$-law-value of the first octet. The $\mu$-law-value, which may be positive or negative, is obtained from the octet-to-$\mu$-law-value look-up table 85. The second cumulative sum for that path is equal to the previous sum $\Sigma$ plus the $\mu$-law-values of the first and second octets. The third cumulative sum for that path is equal to the previous sum $\Sigma$ plus the $\mu$-law-values of the first, second, and third octets; and so on. The maximum of the absolute value of the eighteen cumulative sum values is then taken and compared to the maxima of the absolute values of the eighteen values of the other seven paths for that state; with the lowest maximum indicating the lowest cost path. The octets (or associated $\mu$-law-values) from the first group (1) are then utilized as the outputs of the shaping selector 80.

It should be appreciated by those skilled in the art that the lowest cost path determination effectively shapes the output of the mapper by reducing the lowest frequency components of the signal. In other words, the running sum can be viewed as a DC component of the signal. By keeping choosing a set of octets which keep the running sum close to zero, the DC component of the signal is kept small.

Once the outputs for a first group (t=1) are determined, the state of the state machine is then updated, the sum $\Sigma$ is updated based on the previous sum $\Sigma$ plus the $\mu$-law-values of the first through sixth octets, and the four sets of values for t=1 are deleted with the four sets of values for t=4 provided for another determination of minimum cost (in order to generate outputs for t=2). According to the preferred embodiment of the invention, the state is updated by setting the state of the state machine to the value of the first bit of the frame indicator of the selected frame. For example, if the state machine was in state 1, and path 61 was selected as the lowest cost path, the state machine would remain in state 1 as the first bit of n10(1) is a "1". On the other hand, if in state 1 path 31 were to be selected as the lowest cost path, the state machine would move to state 0 as the first bit of n01(1) is a "0".

If desired, in the first mode, rather than calculating the cost of each path by taking the maximum absolute value of the sums for that path, additional criteria may be applied. For example, each $\mu$-law-value, or groups of $\mu$-law-values may be weighted by different weights, with the running sums being calculated utilizing the weighted values. In addition, or in lieu of weighted values, the power P of a group of points can be used as a criterion in selecting a set of octets. Thus, the cost of a path could be set as a function of the power and the maximum absolute value of the running sums of that path, max(abs(u)). In other words, the cost w=Z(P)+max(abs(u)), where Z is a preset constant. This power shaping is particularly advantageous with respect to certain constellations associated with certain data rates where transmitted power is a large concern (i.e., where the power of the constellation without power shaping exceeds an allowed predetermined threshold such as −12.0 dBm). It is noted, however, that where it is desirable to increase power, the constant Z may be a negative number.

According to a presently preferred embodiment of the invention, instead of using cumulative sum filtering, general linear filtering is utilized to generate the costs of the different paths of the convolutional encoder. Thus, with look-ahead equal to two in the convolutional encoder (and a frame size of six symbols), eighteen candidate costs for each path are calculated according to $c(t)=A_0\mu(t)+A_1\mu(t-1)+A_2\mu(t-2)+\ldots+A_M\mu(t-M)+B_1c(t-1)+B_2c(t-2)+\ldots+B_Kc(t-K)$, where $A_0$ through $A_M$ and $B_1$ through $B_K$ are coefficients, c(t) are candidate costs, and $\mu$ is a signed $\mu$-law value of the signal. By manipulating the coefficients $A_0$ through $A_M$ and $B_1$ through $B_K$ the spectrum of the outputs can be advantageously shaped to reduce low frequency components. Thus, according to a presently preferred embodiment, $A_0=1$, $A_1$ through $A_M$ are set to zero, and $B_3$ through $B_K$ are set to zero so that the cost $c(t)=\mu(t)+B_1c(t-1)+B_2c(t-2)$. In the presently preferred embodiment, when the time index t relates to the first symbol in an eighteen symbol path, c(t−2) and c(t−1) are taken as the costs of the fifth and sixth calculated costs from the previously selected path. Similarly, when the time index t relates to the second symbol in an eighteen symbol path, c(t−1) is taken as the previously calculated cost, and c(t−2) is taken as the cost of the sixth calculated cost from the previously selected path.

It should be appreciated that the running sum filter is a special case of a general linear filter, where $A_0=B_1=1$, and coefficients $A_1$ through $A_M$ and $B_2$ through $B_K$ are set to zero. It should also be appreciated by those skilled in the art that other cost functions could be utilized, whether using the general linear filter form with different coefficients, or of different form altogether. Regardless, of how derived, the costs are used in selecting the path from which the output point is taken.

Having described the first mode (spectral and power shaping with convolutional encoding) in detail, the other three modes of the invention should be easily understood. The second mode is the power shaping (without convolutional encoding) mode (hereinafter referred to as the "second mode"). In the second mode, a subgroup of six bits are grouped together as sign bits, differentially encoded by the differential encoder 60, and provided to the sign function block 65. Under mode control, the sign function block 65 does not process the sign bits (i.e., spectral shaping is disabled) but provides them, as differentially encoded, for combination with the output(s) of the point selector 75. A second subgroup of eleven bits is provided by the grouping logic block 40 to the magnitude function block 70, which, under mode control, appends a twelfth bit to the eleven bits and generates two twelve bit vectors as described above with reference to the first mode. A third subgroup of twenty-five bits is provided to the arithmetic unit 45 which generates a series of six quotients as described above with reference to the first mode. The twelve bit vectors and the quotients are then used by the point selector 75 to select two sets of seven-bit point indicators as discussed above with reference to the first mode. The two sets of indicators are then combined with the sign bits to provide two sets of six eight-bit values to the shaping selector. In the second mode, under control of the mode control block 100, and utilizing the $\mu$-law table 85, the shaping selector 80 calculates the power of both sets of eight-bit values, and chooses the set with the lower (lowest) power for output. In the second mode, the shaping selector 80 does not utilize convolutional encoding, and thus does not store the information for look-ahead purposes.

According to the invention, a third mode of encoding utilizes power shaping with convolutional encoding (hereinafter referred to as the "third mode"). In the third mode, the same subgrouping of bits as conducted in the first and second modes is conducted by the grouping logic means 40. As with the second mode, the six sign bits are differentially encoded by the differential encoder 60 and provided to the sign function block 65. Under mode control, the sign function block 65 does not process the bits, but provides them for combination with the outputs of the point selector 75. Similarly, a second subgroup of eleven bits are provided by the grouping logic block 40 to the magnitude function block 70, which appends a twelfth bit to the eleven bits. However, rather than generating two twelve bit vectors as described above with reference to the first and second modes, in the third mode, under mode control, four magnitude vectors are generated by the magnitude function block 70. In particular, according to a preferred embodiment of the third mode, four magnitude vectors are generated by using the assemblage as a first magnitude vector, and generating three additional magnitude vectors by taking the XOR of the assemblage with the vectors (1,1,1,1,1,1,0,0,0,0,0,0), (0,0,0,0,0,0,1,1,1,1,1,1), and (0,1,0,1,0,1,0,1,0,1,0,1). Alternatively, according to another embodiment of the third mode, the three additional magnitude vectors are generated by taking the XOR of the assemblage with the vectors (1,1,1,1,1,1,0,0,0,0,0,0), (0,0,0,0,0,0,1,1,1,1,1,1), and (1,1,1,1,1,1,1,1,1,1,1,1). Of course, different vectors could be utilized in generating three additional magnitude vectors. Regardless, all four magnitude vectors are provided to the point selector 75. As with the first and second modes, in the third mode, a third subgroup of twenty-five bits is provided to the arithmetic unit 45 which generates a series of six quotients. Under mode control, the four twelve bit magnitude vectors and the quotients are then used by the point selector 75 to select four sets of seven-bit point indicators. The four sets of indicators are then combined with the sign bits to provide four sets of six eight-bit values to the shaping selector. In the third mode, under control of the mode control block 100, the shaping selector 80 stores the incoming sets of eight-bit values and uses them in the convolutional encoder as described above with reference to the first mode. The criteria for selecting output values in the third mode, however, is preferably based solely on the power of the paths, as opposed to limiting the low frequency components of the output signal.

It should be appreciated by those skilled in the art that the second mode described above is effectively a subset of the third mode in that by setting the convolutional encoder of the third mode to look-ahead "zero", and by using only two of the four magnitude vectors of the third mode, the second mode is obtained. Therefore, it will be appreciated that in an alternative to the second mode, four magnitude vectors may be utilized to generate four sets of values for lowest power analysis by the shaping selector.

The fourth mode of encoding according to the invention is the straight-forward mapping mode which neither utilizes power or spectral shaping nor convolutional encoding (hereinafter referred to as the "fourth mode"). In the fourth mode, under mode control, six sign bits are differentially encoded by the differential encoder 60 and provided to the sign function block 65. Under mode control, the sign function block 65 does not process the bits, but provides them for combination with the output of the point selector 75. In addition, in the fourth mode, under mode control, the grouping logic groups twelve magnitude bits together which are provided to the magnitude function block 70. In the fourth mode, under mode control, the magnitude function block 70 does not process these bits but provides the bits to the point selector. Further, in the fourth mode, under mode control, the grouping logic groups twenty-four bits together which are provided to the arithmetic unit 45. Under mode control, the arithmetic unit 45 generates a series of six quotients which are provided to the point selector 75. The point selector, using the quotients and the twelve bit magnitude vector selects a series of six seven-bit point indictors, which when combined with the sign bits generates a set of six eight-bit values for the shaping selector. Under mode control, the eight-bit vectors are directly passed to output by the shaping selector 75.

It should be appreciated that in the fourth mode, rather than generating a frame of six points at a time, different numbers of bits may be grouped together depending upon bit rate and the dimension of the constellation to be utilized. For the specific example of an output rate of 56K, in the fourth mode, rather than grouping forty-two bits together, seven bits may be grouped together at a time. From the seven bits, one bit is used as a sign bit, two are used as magnitude bits, and four are used as a quotient.

It should also be appreciated that under certain specific circumstances, the fourth mode of mapping will permit higher data rates than the other three modes of mapping, as no coding bits are added in the magnitude function block. On the other hand, in many other circumstances, because of power considerations and/or introduction of low frequency distortion in the channel, maximum data rates obtainable using the fourth mode of mapping may be less than the data rates obtainable using other modes.

The entire discussion above has been substantially directed to (although not limited to) the preferred embodiment of a six symbol frame (optimal for robbed bit signaling issues) using a six dimensional constellation. In addition, the entire above discussion was substantially directed to (although not limited to) a modem having a nominal data rate of 56 kbps. However, it will be appreciated by those skilled in the art that a modem which provides for a choice of data rates is desirable, and that the modem might have a frame having other than six symbols, or a frame of six symbols comprised of one or more 3D, 2D, and/or 1D constellations. Thus, according to a preferred aspect of the invention, and as discussed in the parent applications hereto, the number of incoming bits initially grouped together is related to the data rate and the mode of operation, with many different data rates being enabled through the use of several N-dimensional constellations as defined in the parent applications (N being an integer$\geq 1$). In addition, the number of incoming bits initially grouped together can be related to the length of the frame. Regardless of how many incoming bits are initially grouped together, from the grouped bits, the subgroup of sign bits is drawn, preferably with one sign bit for each octet which is to be generated from the group of bits. Likewise, from the grouped bits, another subgroup of magnitude manipulation bits is drawn; and while the preferred embodiment in three of the four modes utilized twice the number of sign bits minus one for the magnitude manipulation bits, it will be appreciated that different numbers of magnitude manipulation bits can be subgrouped together. In fact, these bits need not be distributed evenly per slot for use in the point selector.

Those skilled in the art will appreciate that demappers according to the invention use techniques corresponding substantially to the inverse of the mapping techniques described herein.

There have been described and illustrated herein apparatus and methods for the mapping of data in a high data rate modem. While particular embodiments of the invention have been described, it is not intended that the invention be limited exactly thereto, as it is intended that the invention be as broad in scope as the art will permit. Thus, while the invention has been described with respect to certain hardware, it will be appreciated that various functions can be carried out in different hardware and/or software. Indeed, the invention has application to both analog and digital transport types of modems. In addition, while particular code ($\mu$-law) has been described, it will be appreciated that code such as A-law can be stored in memory. Further, while the point selector was described as providing seven-bit constellation point indicators to the shaping selector which utilizes an octet-to-$\mu$-law-value look-up table 85 for its determinations, it will be appreciated that the $\mu$-law value could be stored in the constellation memory or that a seven-bit look-up table could be provided in the point selector for transfer to the shaping selector for its determinations. Also, if desired that mapping of the $\mu$-law values in the look-up table can be changed.

It will also be appreciated by those skilled in the art that while a specific method and equation were described for use by the point selector means in making its selection of constellation points, other methods and equations could be utilized. For example, the $N_k$ values need not be equal to divisor bases, or equal to one another. Likewise, different manners of calculating $h_k$ can be utilized, and $h_k$ could be a function of other than two bits, and can take on more possible values if desired. Moreover, rather than solving an equation for an index value $p_k$, a look-up table may be utilized. Similarly, while specific cost functions were described with respect to the shaping selector means, different cost functions could be utilized to achieve the same and/or different objectives. For example, rather than spectral shaping with a low DC component, high frequency attenuation might be desirable. Also, the cost for a path could be determined in many different manners using different criteria, and rather than utilizing the lowest cost path in choosing a point for transmission, suboptimal criteria could be utilized if desired. Further, details of the convolutional encoder might be changed. For example, the convolutional encoder could be provided with a larger number of states and/or a different number of transitions between states. Changes in the code might be dictated by the generation of more outputs from the magnitude function block, and/or by the grouping of less than f sign bits per frame (with one or more sign bits being generated for processing in the sign function block). In addition, when a rotationally invariant convolutional code is required, as in the preferred embodiment of the invention, the differential encoding must be matched to the convolutional code.

Further yet, it will be appreciated that the processing of the magnitude and sign bits may be accomplished in other manners. For example, differential encoding is not necessarily required. Also, the appended bit for the magnitude vector in three of the modes need not be appended as the last bit of a vector, but could be inserted into a different location. Moreover, the appended bit could be generated as a parity bit, provided that the vectors are detectable. Also, more than one bit can be appended to generate the magnitude vector. Therefore, it will be apparent to those skilled in the art that other changes or modifications may be made to the invention as described in the specification without departing from the spirit and scope of the invention as claimed.

We claim:

1. A PAM mapper, comprising:
   a) memory means for storing indications of at least one PAM constellation; and
   b) code generation means coupled to said memory means, said code generation means adapted to function in a first spectral and power shaping mode and in a second power shaping mode without spectral shaping, said code generation means including
      (i) grouping logic means for taking a group of incoming bits, and in both said first and second modes, for dividing said group of incoming bits into a first subgroup of bits, a second subgroup of bits, and a third subgroup of bits,
      (ii) means for receiving said first subgroup of bits, and for generating therefrom in said first mode two sign manipulation vectors, and in said second mode a single sign vector,
      (iii) means for receiving said second subgroup of bits and for generating therefrom in said first and second modes at least two magnitude manipulation vectors,
      (iv) means for receiving said third subgroup of bits and generating at least one integer value therefrom,
      (v) point selector means for receiving said at least two magnitude manipulation vectors and said at least one integer value, and for selecting at least two sequences of at least one indication of a constellation point each from said at least one PAM constellation, and
      (vi) a shaping selector means including a convolutional encoder, said shaping selector means for receiving said at least two sequences and for receiving in said first mode said two sign manipulation vectors and in said second mode said single sign vector, said shaping selector means for selecting a convolutionally encoded output in said first mode based on said at least two sequences and said two sign manipulation vectors, and in said second mode based on said at least two sequences and said single sign vector.

2. A PAM mapper according to claim 1, wherein:
said means for receiving said second subgroup of bits generates a first number of magnitude vectors in said first mode and a second number of magnitude vectors different than said first number in said second mode.

3. A PAM mapper according to claim 2, wherein:
said second number of magnitude vectors is four magnitude vectors.

4. A PAM mapper according to claim 3, wherein:
said means for receiving said second subgroup of bits comprises magnitude manipulation means for appending a bit of predetermined value to said second subgroup of bits to generate an assemblage, for taking said assemblage as a first magnitude vector, and for generating three additional magnitude vectors by XORing said assemblage with three additional vectors.

5. A PAM mapper according to claim 4, wherein:
said three additional vectors comprise a first vector having a first number of ones followed by the same number of zeros, a second vector having said first number of zeros followed by said same number of ones, and a third vector either having the same number of alternating ones and zeros or having all ones.

6. A PAM mapper according to claim 1, wherein:
in said first mode said convolutional encoder receives at least four combinations of said at least two sequences and said two sign manipulation vectors, and in said second mode said convolutional encoder receives at least two combinations of said at least two sequences and said sign vector.

7. A PAM mapper according to claim 1, wherein:
said means for receiving said first subgroup of bits comprises a differential encoder and sign manipulation means for manipulating said first subgroup of bits in said first mode to generate a first sign vector, wherein a second sign vector is taken from an output of said differential encoder.

8. A PAM mapper according to claim 1, wherein:
said code generation means is adapted to function in a third straight mapping mode without power or spectral shaping, wherein in said third mode said means for receiving said first subgroup of bits generates a single sign vector, said means for receiving said second subgroup of bits provides said second group of bits as a single magnitude vector, said point selector means selects a single sequence of at least one indication of a constellation point from said at least one PAM constellation, and said shaping selector means uses said indication of a constellation point and said single sign vector for generating an output.

9. A PAM mapper according to claim 8, wherein:
said code generation means is adapted to function in a fourth power shaping mode without spectral shaping, wherein in said fourth mode
said means for receiving said first subgroup of bits generates a single sign vector,
said means for receiving said second subgroup of bits generates therefrom at least two magnitude manipulation vectors, said point selector means selects at least two sequences of at least one indication of a constellation point each from said at least one PAM constellation, and said shaping selector means calculates power associated with said at least two sequences and selects a point from said at least two sequences based on power calculations.

10. A PAM mapper according to claim 1, wherein:

said code generation means is adapted to function in a third power shaping mode without spectral shaping, wherein in said third mode said means for receiving said first subgroup of bits generates a single sign vector, said means for receiving said second subgroup of bits generates therefrom at least two magnitude manipulation vectors, said point selector means selects at least two sequences of at least one indication of a constellation point each from said at least one PAM constellation, and said shaping selector means calculates power associated with said at least two sequences and selects a point from said at least two sequences based on power calculations.

11. A PAM mapper according to claim 1, wherein:

said shaping selector means selects a convolutionally encoded output based on at least one specified criterion.

12. A PAM mapper according to claim 11, wherein:

in said first mode said convolutional encoder implements a general linear filter and said at least one specified criterion is a cost function, and in said second mode said specified criterion is an indication of the power of the paths in said convolutional encoder.

13. A PAM mapper according to claim 11, wherein:

said shaping selector means further comprises an octet-to-$\mu$-law-value look-up table.

14. A PAM mapper, comprising:

a) memory means for storing indications of at least one PAM constellation; and b) code generation means coupled to said memory means, said code generation means adapted to function in a first spectral and power shaping mode and in a second straight mapping mode without power or spectral shaping, said code generation means including (i) grouping logic means for taking a group of incoming bits, and in both said first and second modes, for dividing said group of incoming bits into a first subgroup of bits, a second subgroup of bits, and a third subgroup of bits, (ii) means for receiving said first subgroup of bits, and for generating therefrom in said first mode two sign manipulation vectors, and in said second mode for using said first subgroup of bits as a single sign vector, (iii) means for receiving said second subgroup of bits and for generating therefrom in said first mode at least two magnitude manipulation vectors, wherein in said second mode said second subgroup of bits are taken as a single magnitude vector, (iv) means for receiving said third subgroup of bits and generating at least one integer value therefrom, (v) point selector means for receiving in said first mode at least two magnitude manipulation vectors and said at least one integer value, and for selecting at least two sequences of at least one indication of a constellation point each from said at least one PAM constellation, and for receiving in said second mode said single magnitude vector and said at least one integer value and for selecting a single sequence of at least one indication of a constellation point from said at least one PAM constellation, (vi) a shaping selector means including a convolutional encoder, said shaping selector means for receiving in said first mode said at least two sequences and said two sign manipulation vectors and for selecting in said first mode a convolutionally encoded output based on said at least two sequences and said two sign manipulation vectors, said shaping selector means for receiving in said second mode said single sequence and for using said single sequence as outputs.

15. A PAM mapper according to claim 14, wherein:

in said first mode said convolutional encoder implements a general linear filter.

16. A PAM mapper, comprising:

a) memory means for storing indications of at least one PAM constellation; and b) code generation means coupled to said memory means, said code generation means adapted to function in a first power shaping mode and in a second straight mapping mode, said code generation means including (i) grouping logic means for taking a group of incoming bits, and in both said first and second modes, for dividing said group of incoming bits into a first subgroup of bits, a second subgroup of bits, and a third subgroup of bits, (ii) means for receiving said first subgroup of bits, and for generating therefrom in said first mode a single sign vector, (iii) means for receiving said second subgroup of bits and for generating therefrom in said first mode at least two magnitude manipulation vectors, and in said second mode, a single magnitude vector, (iv) means for receiving said third subgroup of bits and generating at least one integer value therefrom, (v) point selector means for receiving in said first mode said at least two magnitude manipulation vectors and said at least one integer value, and for selecting at least two sequences of at least one indication of a constellation point each from said at least one PAM constellation, and for receiving in said second mode said magnitude vector and said at least one integer value and for selecting a single sequence of at least one indication of a constellation point from said at least one PAM constellation, (vi) a shaping selector means including a convolutional encoder, said shaping selector means for receiving in said first mode said at least two sequences and said single sign vector, said shaping selector means for selecting a convolutionally encoded output in said first mode based on said at least two sequences and said single sign vector, said shaping selector means for receiving in said second mode said single sequence and for using said single sequence as outputs.

17. A PAM mapper according to claim 16, wherein:

said at least two magnitude vectors comprises four magnitude vectors.

18. A PAM mapper according to claim 16, wherein:

said means for receiving said second subgroup of bits comprises magnitude manipulation means for appending a bit of predetermined value to said second subgroup of bits in said first mode to generate an assemblage, for taking said assemblage as a first magnitude vector, and for generating three additional magnitude vectors by XORing said assemblage with three additional vectors.

19. A PAM mapper according to claim 18, wherein:

said three additional vectors comprise a first vector having a first number of ones followed by the same number of zeros, a second vector having said first number of zeros followed by said same number of ones, and a third vector either having the same number of alternating ones and zeros or having all ones.

* * * * *